(12) United States Patent
Pellman

(10) Patent No.: US 8,646,715 B2
(45) Date of Patent: Feb. 11, 2014

(54) ATTACHMENT FOR ROTARY MATERIAL PROCESSING MACHINES

(75) Inventor: David C. Pellman, Coleman, WI (US)

(73) Assignee: Patz Corporation, Pound, WI (US)

( * ) Notice: Subject to any disclaimer, the term of this patent is extended or adjusted under 35 U.S.C. 154(b) by 0 days.

(21) Appl. No.: 13/619,322

(22) Filed: Sep. 14, 2012

(65) Prior Publication Data

US 2013/0284841 A1    Oct. 31, 2013

Related U.S. Application Data

(63) Continuation of application No. 13/493,656, filed on Jun. 11, 2012, now abandoned.

(60) Provisional application No. 61/638,541, filed on Apr. 26, 2012.

(51) Int. Cl.
*B02C 7/04* (2006.01)
*B02C 19/00* (2006.01)
*B01F 7/24* (2006.01)

(52) U.S. Cl.
USPC ............... 241/261.1; 241/101.76; 366/314

(58) Field of Classification Search
USPC ........... 241/261.1, 101.76, 101.761; 366/314, 366/319
See application file for complete search history.

(56) References Cited

U.S. PATENT DOCUMENTS

| | | | |
|---|---|---|---|
| 4,078,571 A | 3/1978 | Todd et al. | |
| 4,395,131 A | 7/1983 | Barlow | |
| 5,148,999 A * | 9/1992 | Curfman et al. | 241/260.1 |
| 5,439,182 A * | 8/1995 | Sgariboldi | 241/260.1 |
| 5,443,588 A * | 8/1995 | Loppoli | 414/526 |
| 5,590,963 A * | 1/1997 | Schuler | 366/302 |
| 5,601,362 A * | 2/1997 | Schuler | 366/309 |
| 5,615,839 A * | 4/1997 | Hartwig | 241/260.1 |
| 5,647,665 A * | 7/1997 | Schuler | 366/196 |
| 5,863,122 A * | 1/1999 | Tamminga | 366/314 |
| 6,328,465 B1* | 12/2001 | Tamminga | 366/314 |
| 6,817,752 B2* | 11/2004 | Tolle | 366/314 |
| 6,923,393 B1* | 8/2005 | Neier et al. | 241/30 |
| 7,347,616 B2* | 3/2008 | Albright | 366/314 |
| 2007/0274151 A1* | 11/2007 | Albright | 366/314 |
| 2010/0039885 A1 | 2/2010 | Baker | |
| 2011/0121114 A1 | 5/2011 | Neier et al. | |
| 2011/0284672 A1 | 11/2011 | Baker | |

OTHER PUBLICATIONS

International Search Report mailed Jan. 17, 2013, for PCT/US2012/041921.

* cited by examiner

*Primary Examiner* — Faye Francis
(74) *Attorney, Agent, or Firm* — Nicholas A. Kees; Godfrey & Kahn, S.C.

(57) ABSTRACT

A material processing machine with a rotating element positioned within a hopper for receiving materials to be processed, the rotating element including an outer edge to which one or more attachments may be mounted. The attachments include a forward edge extending generally forward with respect to the direction of rotation of the rotating element and extending outward from the outer edge of the rotating element. A rotating element for use in a material processing machine has either attachments mounted to an outer edge or integrally formed extensions along an outer edge. The extensions or attachments including a forward edge that extends generally forward with respect to the direction of rotation of the rotating element.

15 Claims, 11 Drawing Sheets

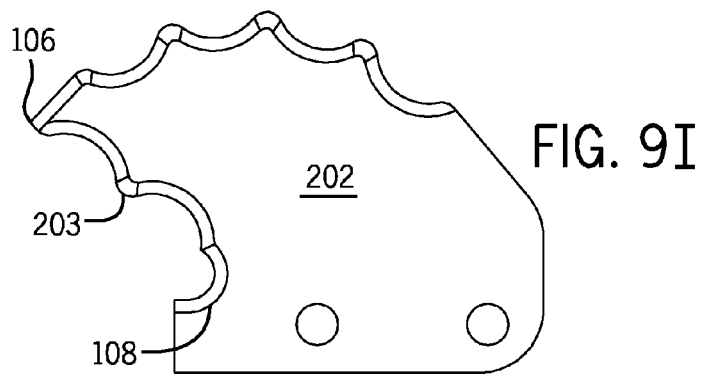
FIG. 9I
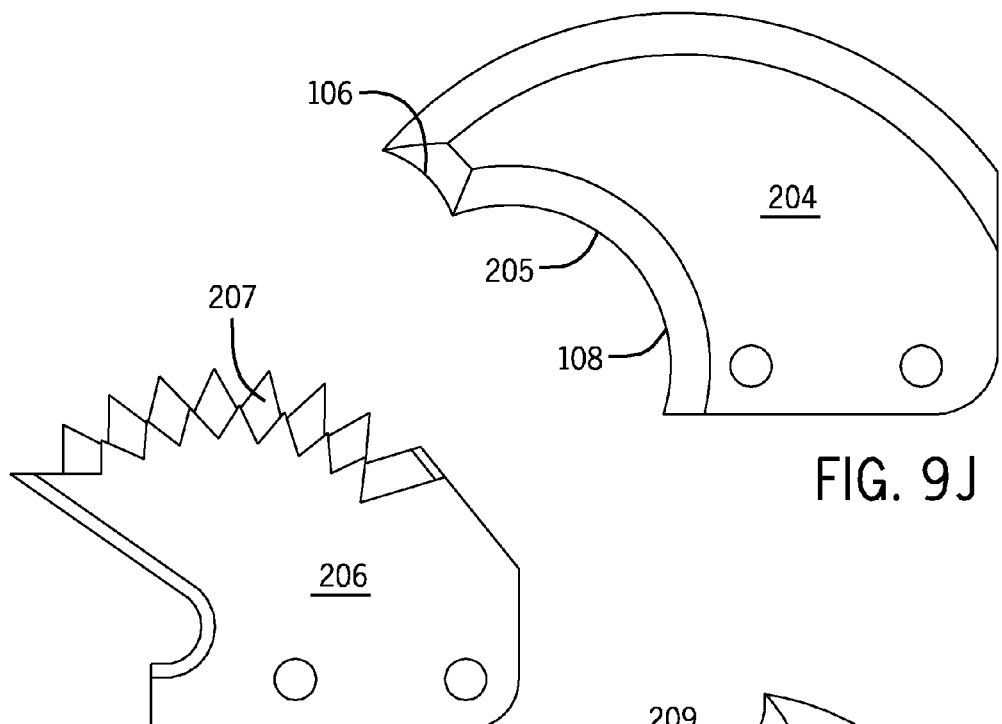
FIG. 9J
FIG. 9K
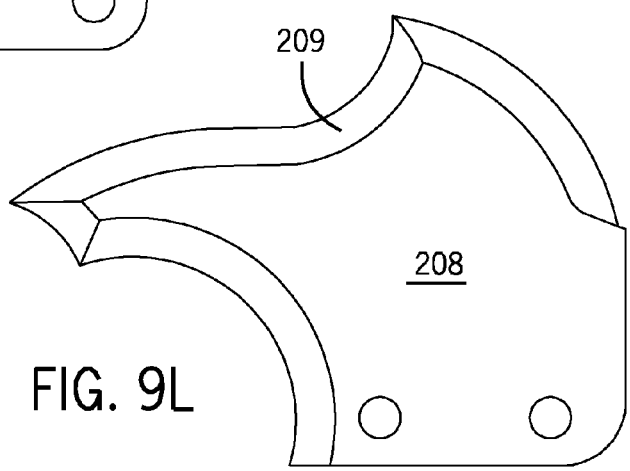
FIG. 9L

FIG. 14
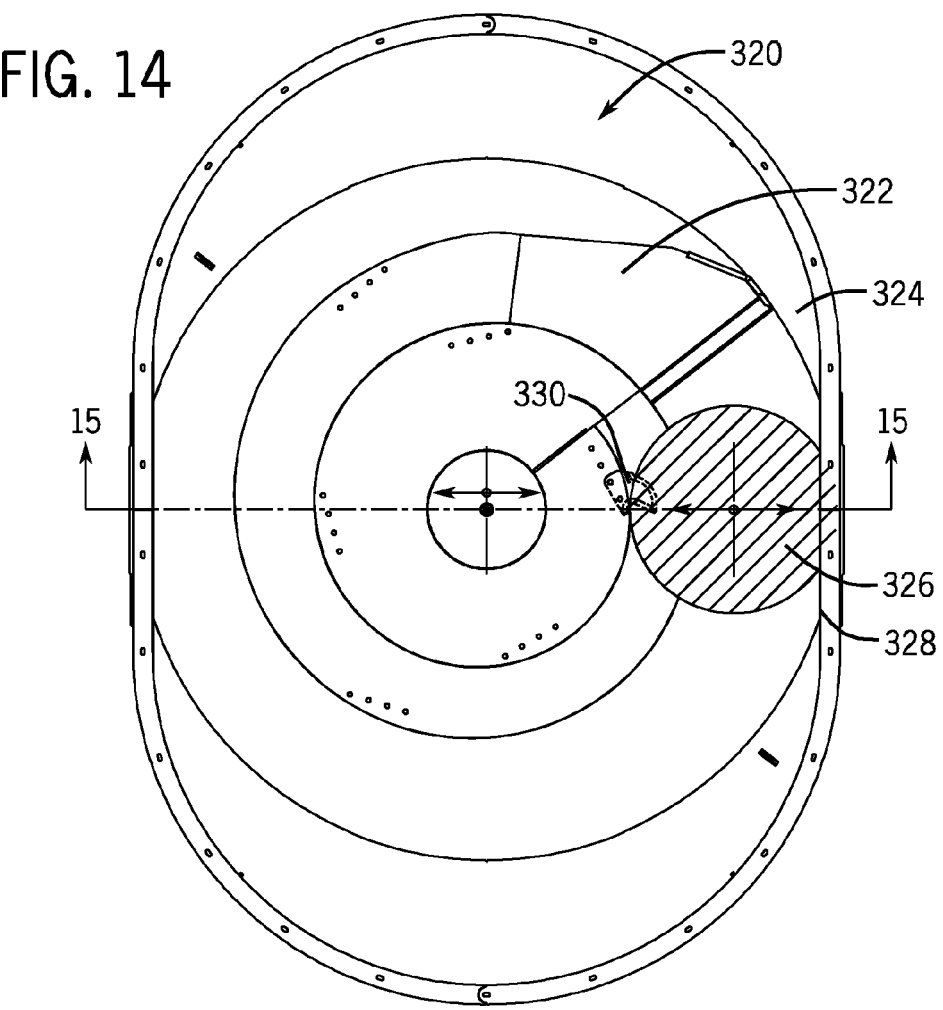
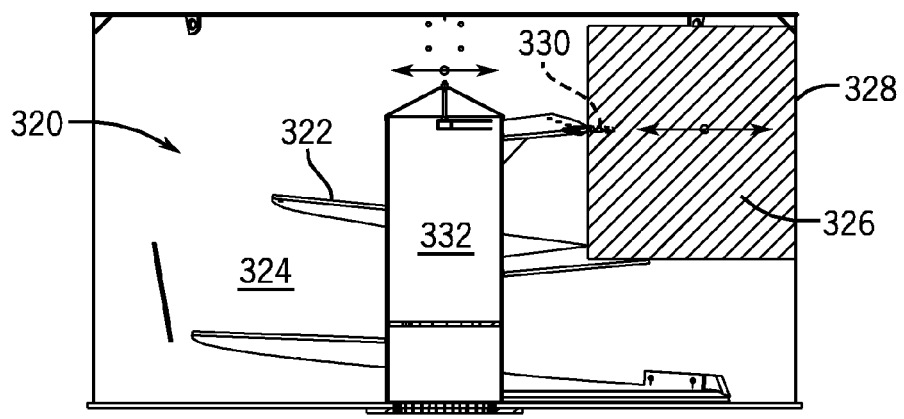
FIG. 15

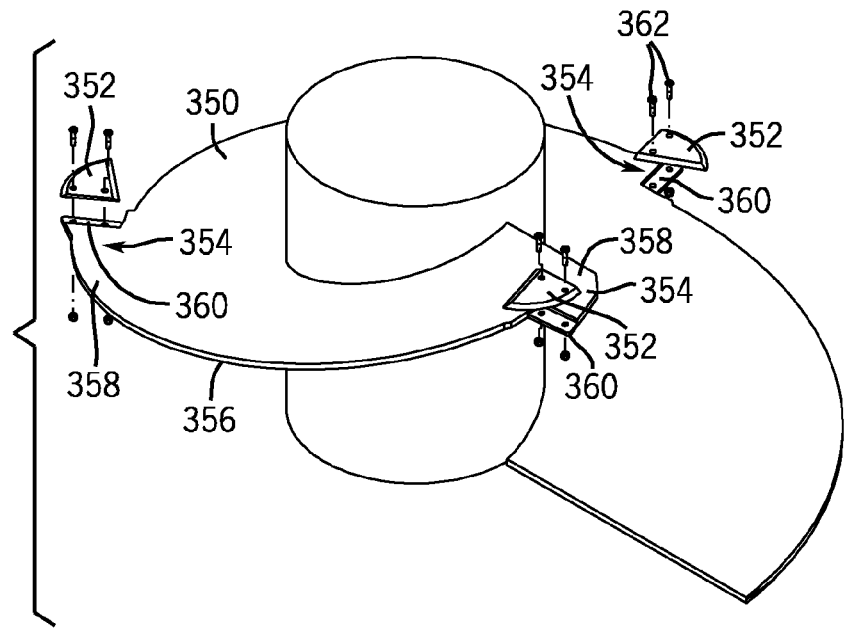
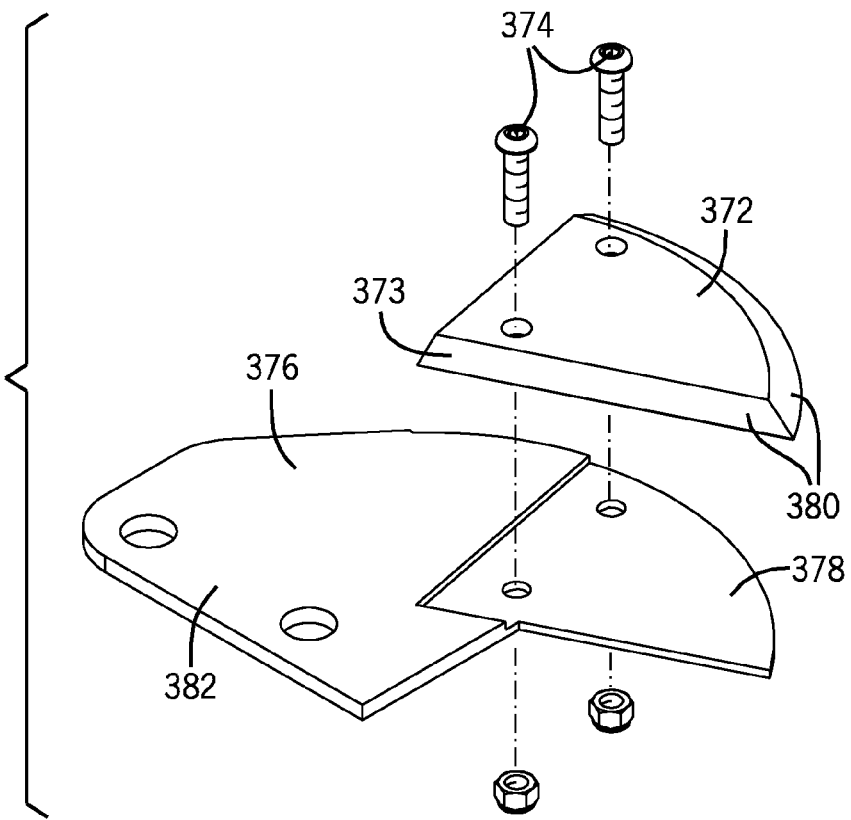

ATTACHMENT FOR ROTARY MATERIAL PROCESSING MACHINES

CROSS-REFERENCE TO RELATED APPLICATIONS

The present application claims priority to U.S. Provisional Application Ser. No. 61/638,541, filed on Apr. 26, 2012, and is a continuation of U. S. patent application Ser. No. 13/493,656, filed on Jun. 11, 2012, now abandoned. The disclosure of both applications is incorporated herein in its entirety by reference.

BACKGROUND

Conventional material processing machines used in, for example, the agricultural industry for feed chopping and mixing may include one or more rotating elements having discs or flighting extending from the elements. The flighting typically engages the material to be chopped and/or mixed and rotation of the rotating element with the material in contact with the flighting causes the chopping and/or mixing of the material. In certain conventional feed mixers, intended to receive all or a large part of a large bale of hay or other feed, the outer edges of conventional flighting, which may have knives attached thereto, are configured to press the bale against a side of a mixing or processing tub to assist in breaking up the bale. See FIGS. 12 and 13 and the discussion below regarding these drawing figures. This structure may potentially place large stresses on the tub walls, the rotating element, the shaft providing rotational force to the rotating element and the motor or drive engaging the shaft. In addition to possible lateral stresses, such a pressing against the side of a mixing tub can require a great deal of torque from the motor or drive.

Examples of conventional machines for processing materials include but are not limited to vertical rotary feed mixers, horizontal rotary mixers and bale choppers, bale processors, feed spreaders, manure and barn waste spreaders, augers and materials handling equipment, and other similar equipment. Other machines that include similar rotating elements such as screws, augers, flights, etc., may include but not be limited to combines and harvesters, bulk hay wagons, wood or brush chippers, and certain types of rotary pumps.

Improvements to these types of machines that typically include rotating screws, flights or augers, are desirable.

BRIEF DESCRIPTION OF THE DRAWINGS

The accompanying drawing figures, which are incorporated in and constitute a part of the description, illustrate several aspects of the invention and together with the description, serve to explain the principles of the invention. A brief description of the figures is as follows:

FIGS. 9A through 9L are top views of a collection of possible alternative embodiments of attachments according to the present disclosure.

FIG. 14 is a top view of a vertical feed mixer with an attachment according to the present disclosure.

FIG. 15 is a cross-sectional view of the vertical feed mixer of FIG. 14, taken along line 15-15.

FIG. 16 is an exploded view of a screw including attachments according to the present disclosure.

FIG. 17 is an exploded view of an attachment and mount for the attachment according to the present disclosure.

DETAILED DESCRIPTION

Figure 1:
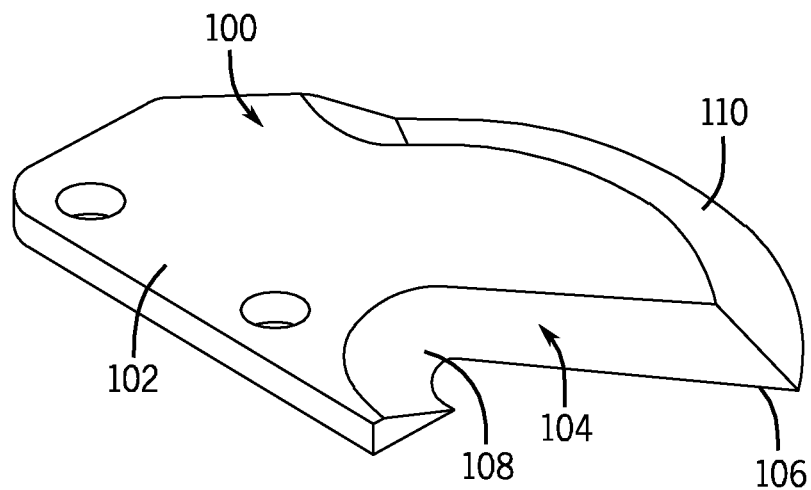
FIG. 1 is a perspective view of an attachment according to the present disclosure.
Figure 2:
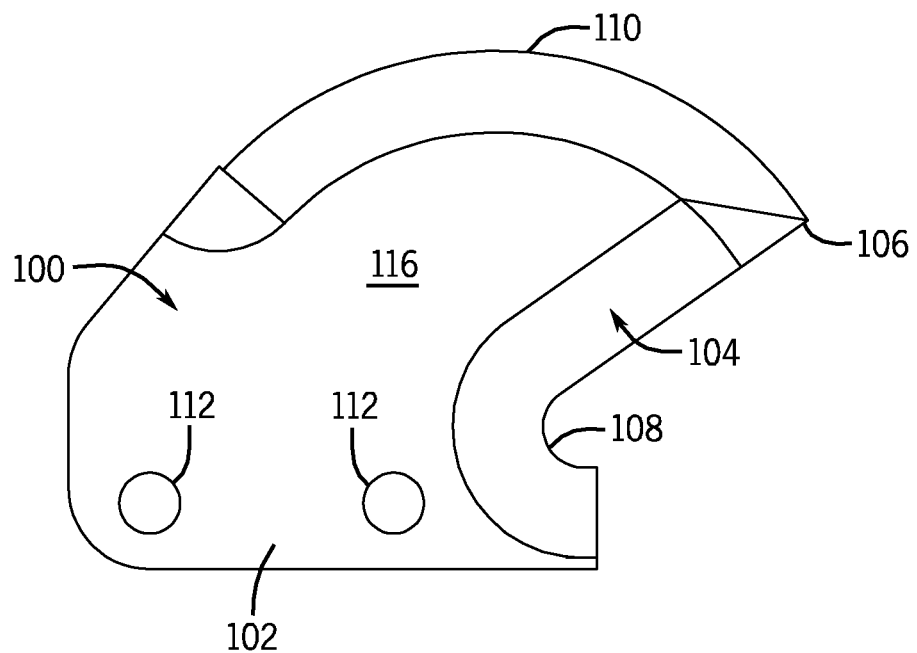
FIG. 2 is a top view of the attachment of FIG. 1.
Figure 3:
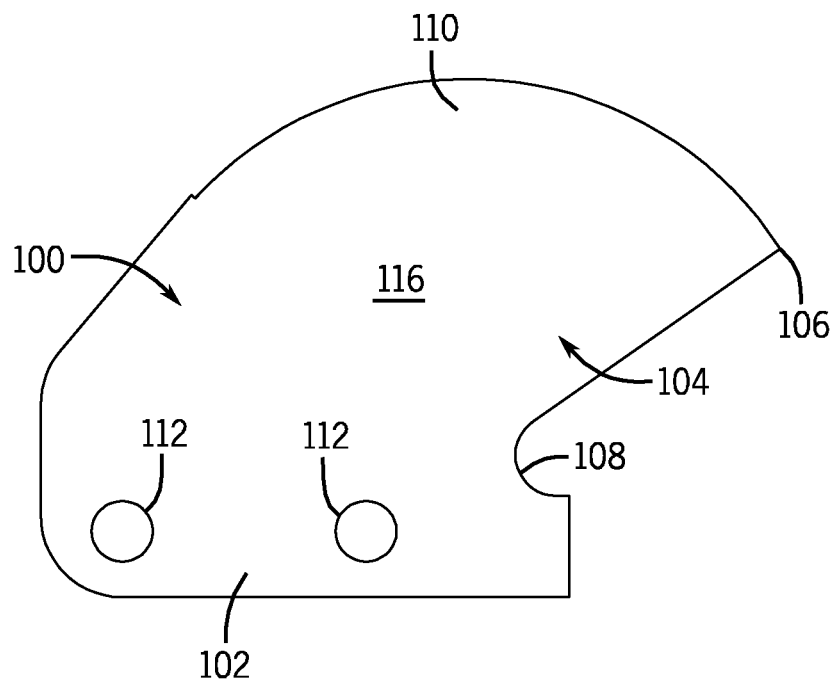
FIG. 3 is a top view of a blank for forming or machining the attachment of FIG. 1.
Figure 4:
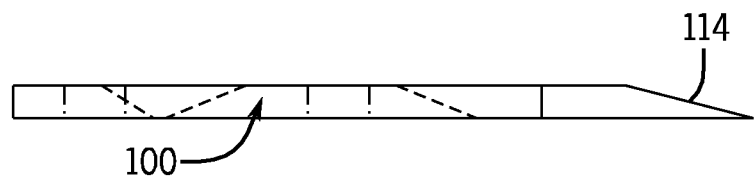
FIG. 4 is an end view of the attachment of FIG. 1.

Reference will now be made in detail to exemplary aspects of the present invention which are illustrated in the accompanying drawings. Wherever possible, the same reference numbers will be used throughout the drawings to refer to the same or like parts.

FIGS. 1 to 4 illustrate an attachment 100 according to the present disclosure that is configured for mounting to an outer edge of a rotating element of a machine such as but not limited to a vertical feed chopper and mixer. Attachment 100 may include an inner side or mounting portion 102 configured to be mounted or physically connected to the rotating element and a forward or cutting edge 104 with a outer extension or portion 106 that extends forward (in a direction of rotation of the rotating element) with respect to an inner portion 108 of cutting edge 104.

Attachment 100 may also include an outer edge 110 that extends further outboard from mounting portion 102 than does outer extension 106 of cutting edge 104. This would make outer edge 110 the furthest from the axis or center of rotation of the element to which attachment 100 is mounted. Outer edge 110 may also serve as an outer cutting edge. As cutting edge 104 pulls material toward the flighting to be cut, outer edge 110 may be slicing into the bale of material to assist in pulling more material off in preparation for the next rotation of the flighting to be engaged by attachment 100. Cutting edge 104 and outer edge 110 may include bevel 114 that tapers from a full thickness of an attachment body 116 to form a sharper cutting edge that is better able to slice through the bale or other material to be processed by the device to which attachment 100 is mounted. In the embodiment shown, attachment 100 includes mounting holes 112 formed in mounting portion 102.

Inner portion 108 is shown having a hooked portion adjacent the mounting portion 102. This hook shape may facilitate the holding of material grabbed by outer extension 106 adjacent inner portion 108. The material grabbed by outer extension 106 will tend to be drawn inward by the rotation of the rotating element to which attachment 100 is mounted, and the forward angle of cutting edge 104. Once the material is held against the cutting edge 104, the rotation of the attachment will tend to cause the material so engaged to be cut. However, it is noted that inner portion 108 may be formed without a hooked portion, such that the cutting edge 104 extends generally linearly from the outer extension toward the mounting portion. So configured, the rotating element to which the attachment 100 is mounted may serve to hold the material drawn inward against the cutting edge 104 until the rotation of the attachment will cause the material to be cut.

Figure 5:
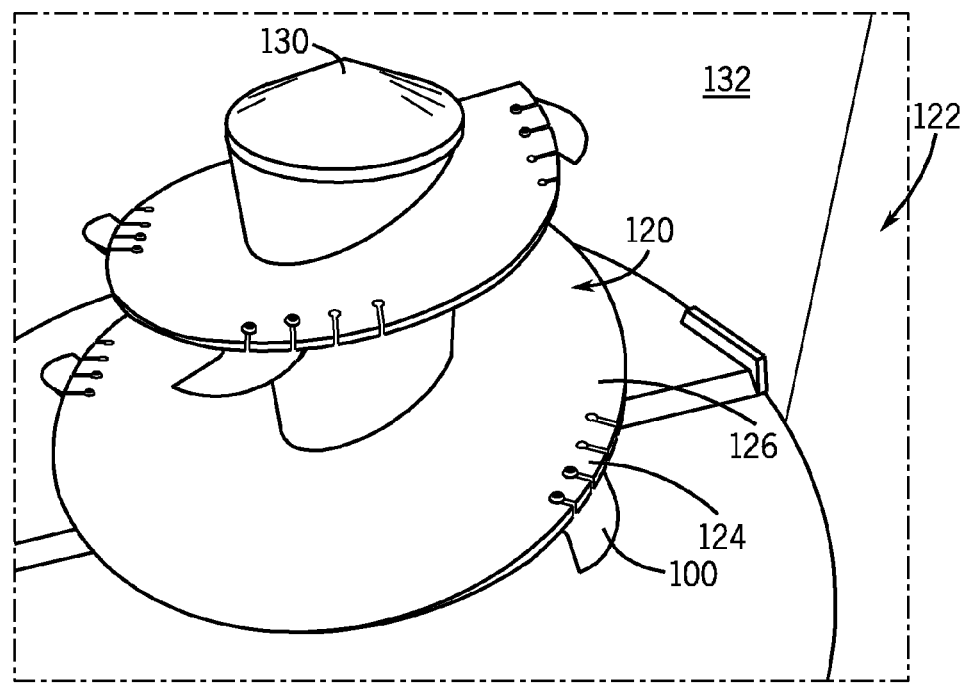
FIG. 5 is a first perspective view of a vertical axis feed cutting and mixing machine with flighting to which the attachment of FIG. 1 is mounted.
Figure 6:
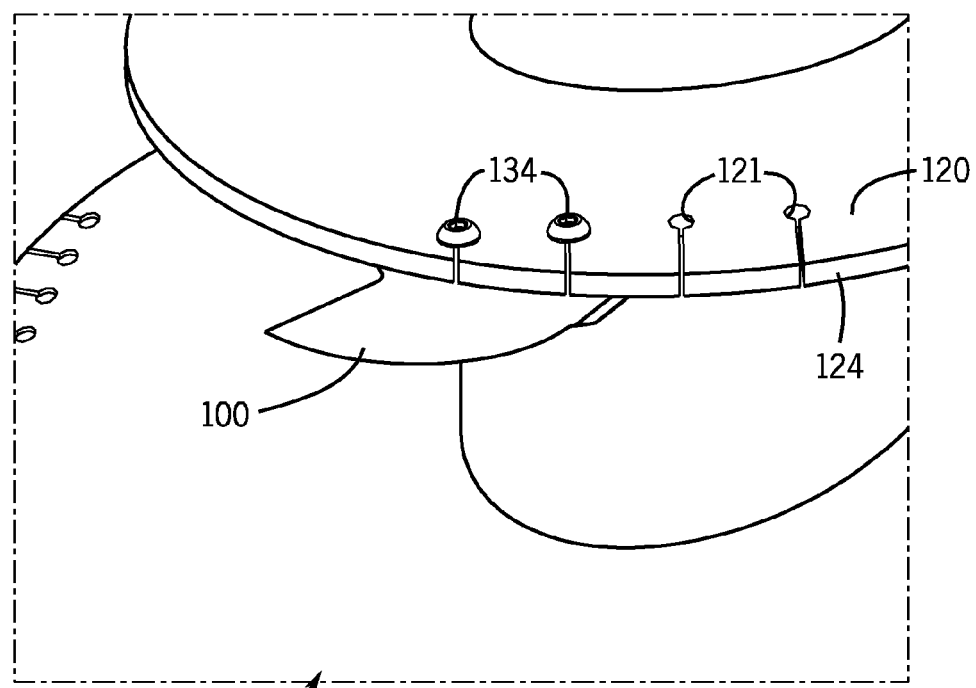
FIG. 6 is a second perspective view of the machine and attachment of FIG. 5.
Figure 7:
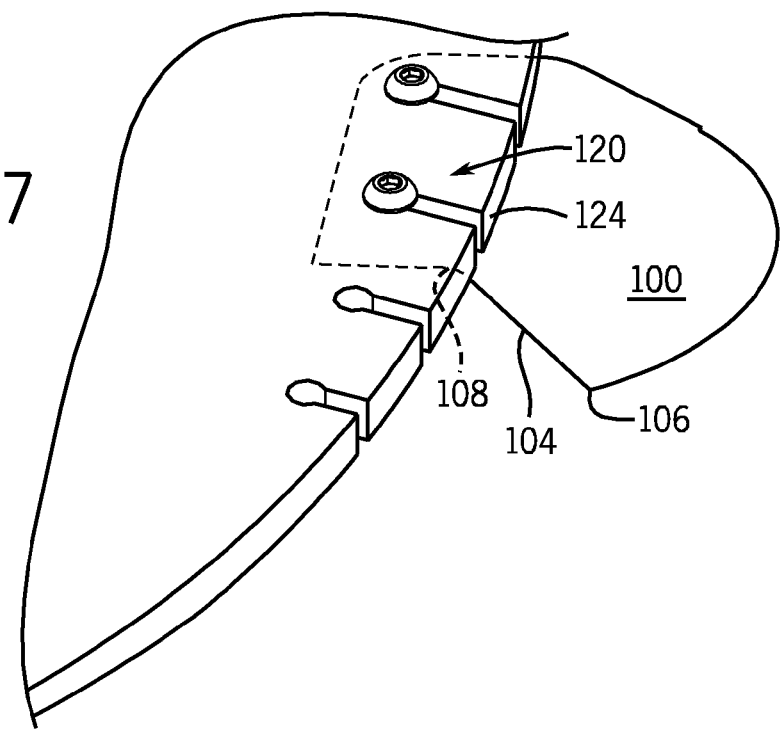
FIG. 7 is a third perspective view of a portion of the machine and attachment of FIG. 5
Figure 8:
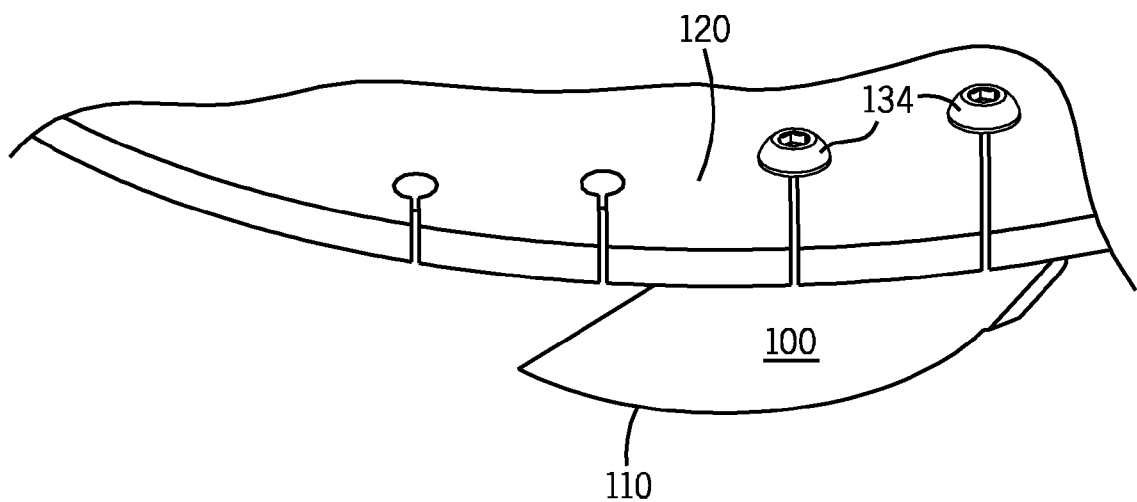
FIG. 8 is a perspective view of same portion the machine shown in FIG. 7, but from a different angle.

FIGS. 5 through 8 illustrate a plurality of attachments 100 mounted to an outer edge 124 of a vertical flighting arrangement 126 of a rotating element 120 of a feed cutting and mixing machine 122. FIG. 5 is the view that shows the greatest amount of the rotating element 120 of the feed cutting and mixing machine 122. FIG. 6 shows the rotating element 120 on a larger scale, with attachments 100. FIGS. 7 and 8 are enlarged further to show further detail.

In the embodiment shown in these drawing figures, machine 122 is a vertical feed mixer, but again, the invention contemplates many other cutting and mixing implements. Rotating element 120 is the part that engages feed material placed in the machine, and in the embodiment shown is configured for clockwise rotation about an axis of rotation 130. Rotating element 120 may be mounted within a hopper 132 within which the material to be processed is placed to be engaged by the flighting arrangement 126 of the rotating element. While the radius of rotating element 120 may vary along the height of rotating element 120, the idea, that each attachment 100 extends beyond the outer edge 124 of the flighting arrangement 126 and extends forward with regard to the direction of rotation, is intended to refer to the specific location where the attachment is mounted. Some attachments may be further away from or closer to the axis of rotation as compared to other attachments, due to variations in the size and shape of rotating element 120.

In addition, some of the attachments 100 may be mounted further away from or closer to the axis of rotation 130 as compared to other attachments, due to the way they are attached to the flighting arrangement 126. As shown best in FIG. 6, but also in FIGS. 5, 7 and 8, in one embodiment, the attachments 100 are mounted to the flighting arrangement 126 by means of fasteners 134 that pass through flighting mounting holes 121 in the flighting, and into or through mounting holes 112 of the attachments. As can be seen in the drawing figures, the flighting mounting holes 121 may be set at different distances from the outer edge 124 of the flighting arrangement 126. In the most preferred embodiment, the flighting mounting holes 121 are set in stepwise order, beginning with one flighting mounting hole 121 formed relatively near the outer edge 124, and ending with the last flighting mounting hole being formed further away from the outer edge. This arrangement of the flighting mounting holes 121 permits the user to mount the attachments 100 so that more of the outer extension 106 is exposed when the attachment is mounted to flighting mounting holes nearer the outer edge 124 (shown best in FIGS. 5 and 6), and less of the outer extension 106 is exposed when the attachment is mounted to flighting mounting holes further away from the outer edge (shown in FIGS. 7 and 8).

The feed material may be presented in the form of bales or other larger aggregations of material, including but not limited to round bales. Rotating element 120 and attachments 100 cooperate to engage the feed material placed within machine 122 to break up the bales or other forms of material, and also engage and cut the material in appropriate sized pieces for easy and controlled mixing and dispensing of feed to livestock. Vertical feed mixers, similar to that shown in FIGS. 5 through 8 but without the attachments 100, are conventional and well known. Examples of such mixers include but are not limited to the Patz Corporation 800 Series TMR Single Screw Vertical Mixer.

As indicated above, FIGS. 7 and 8 illustrate an enlarged view of attachment 100 mounted along outer edge 124 of rotating element 120. As can there be seen, outer extension 106 provides a leading point for cutting edge 104. When mounted as shown in FIGS. 7 and 8, attachment 100 is mounted so that outer edge 124 of rotating element 120 provides the inner boundary for cutting edge 104.

FIGS. 9A through 9L illustrate a plurality of different shapes and styles of alternative embodiments of attachments according to the present disclosure. In some of these alternative embodiments, outer edge 110 does not extend any further out from the mounting surface than does outer extension 106, so that when attachment 100 is rotated, outer extension 106 is the furthest from the center of rotation of the element to which attachment 100 is mounted. In certain of the alternatives, outer edge 110 may be the same thickness of body 116 of attachment 100. The different portions of the attachment that are shown with curved surfaces may be configured with consistent radius curves, as generally shown or may be formed with a variety of different arches and/or shapes that may be regular in form or of varying radii. It is not intended that the present disclosure be limited to any particular shape or form of curve or other type of shape. The selection of the particular shape, beveling, thickness, forward extension, outer extension, etc., with regard to the shape of the attachment may be selected based on the purpose and use of the machine to which the attachment will be affixed, the nature of the material to be processed, the form in which the material will be placed within the machine to be processed, the particular desired end product of the processing, and so on.

As previously indicated, one of the features that is consistent throughout the various designs is an outer extension of the leading or cutting edge that extends forward (in the direction of rotation of the rotating element to which the attachment may be mounted) of an inner portion of the leading edge. Some degree of beveling along the leading edge is generally provided so that the leading edge may effectively cut the material to be processed. In addition, beveling or thinning of the other edges of the attachment may also be provided, beyond the mounting portion where the attachment would engage the rotating element. The length of the beveling and thus the fineness of the edge of the attachment may be selected based on the nature of the material to be processed and the manner in which it is to be processed.

The angle formed by the leading edge with respect to the outer edge of the rotating element may be selected based on any of the various factors listed above. The extent to which the attachment projects beyond the outer edge of the rotating element may be selected based on the power or torque available from the prime mover that is powering the rotation of the rotating element and the characteristics of the material to be processed.

Figure 9A:
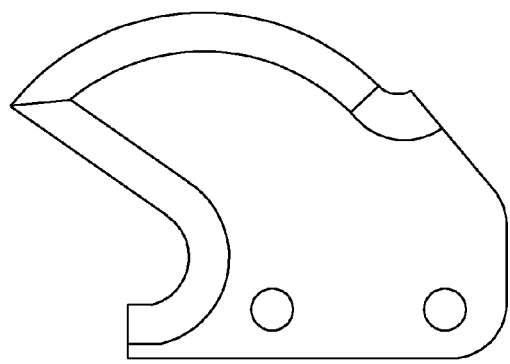
Figure 9B:
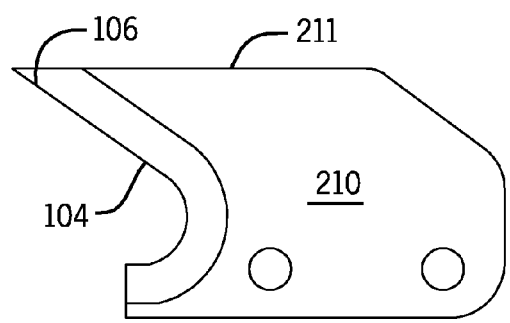
Figure 9C:
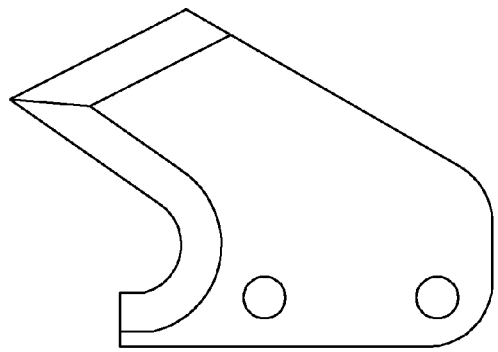
Figure 9D:
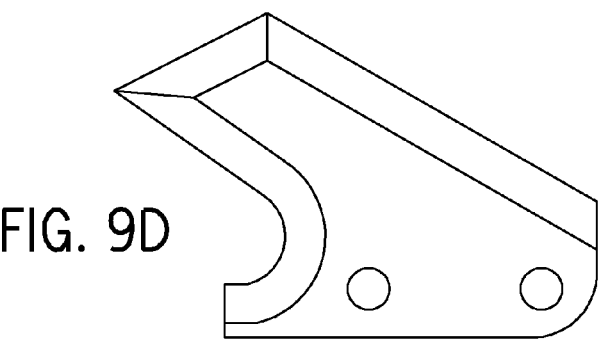
Figure 9E:
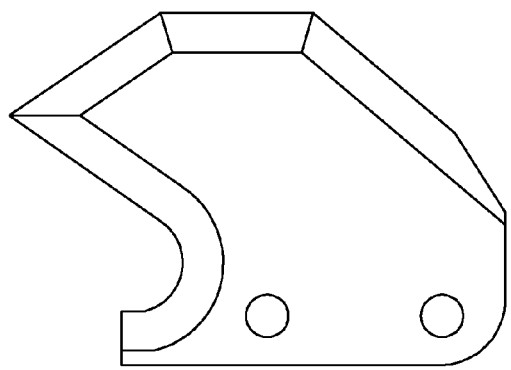
Figure 9F:
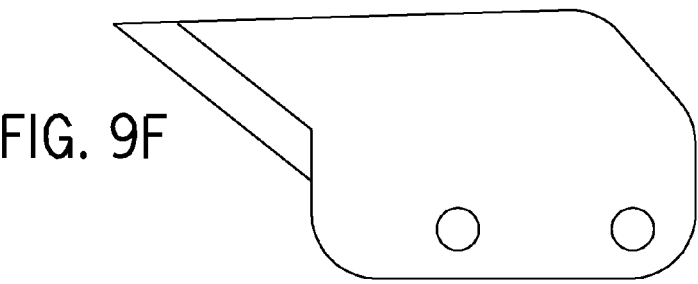
Figure 9G:
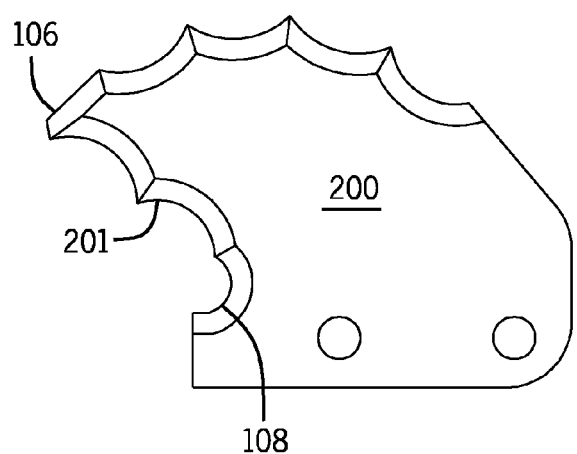
Figure 9H:
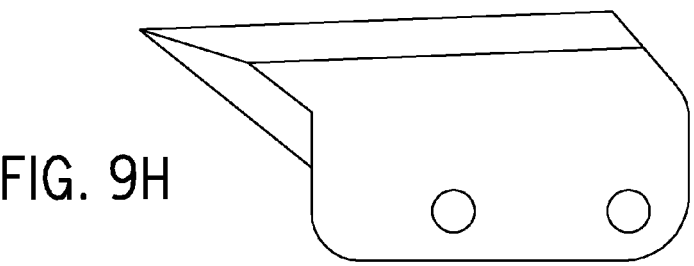

Attachments 200 in FIG. 9G, 202 in FIGS. 9I, and 204 in FIG. 9J, illustrate that an attachment according to the present disclosure may have forward edges, 201, 203 and 205, respectively, that are not linear while still defining a forward positioning of the outer portion 106 with regard to the inner portion 108. Attachments 206 in FIG. 9K and 208 in FIG. 9L illustrate that outer edges 207 and 209, respectively, may be non linear or have a shape that has multiple radii and foci. Attachment 210 in FIG. 9B illustrates an outer edge 211 that does not extend further from the axis of rotation than outer portion 106 of forward edge 104.

Figure 10:
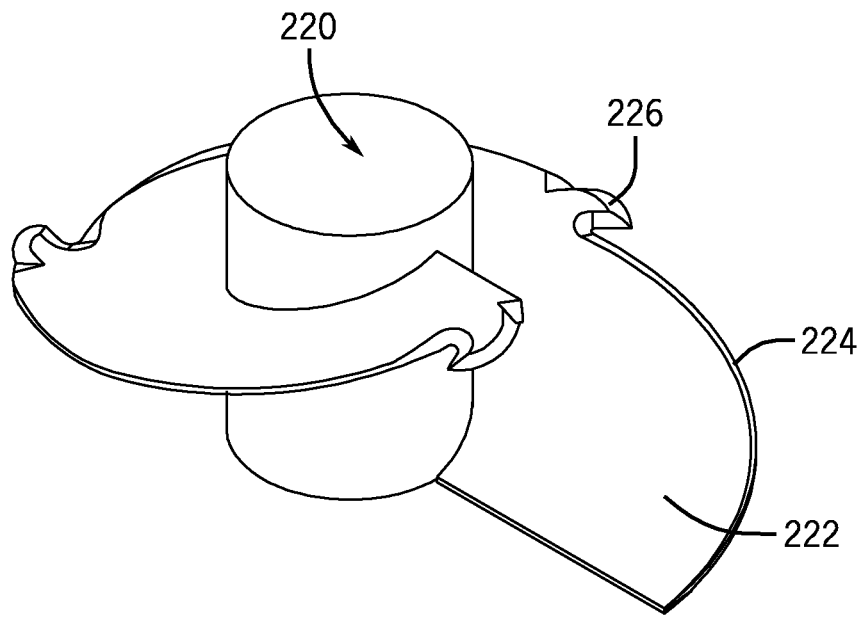
FIG. 10 is a perspective view of a rotating element for a vertical feed mixer with integral extensions according to the present disclosure.

FIG. 10 illustrates a further alternative embodiment of a rotating element 220 according to the present disclosure. Rotating element 220 may include flighting 222 with an outer edge 224. Instead of having attachments mounted to the flighting, rotating element 220 may include integrally formed extensions 226 that are configured and perform in the same manner as attachments, described above.

Figure 11:
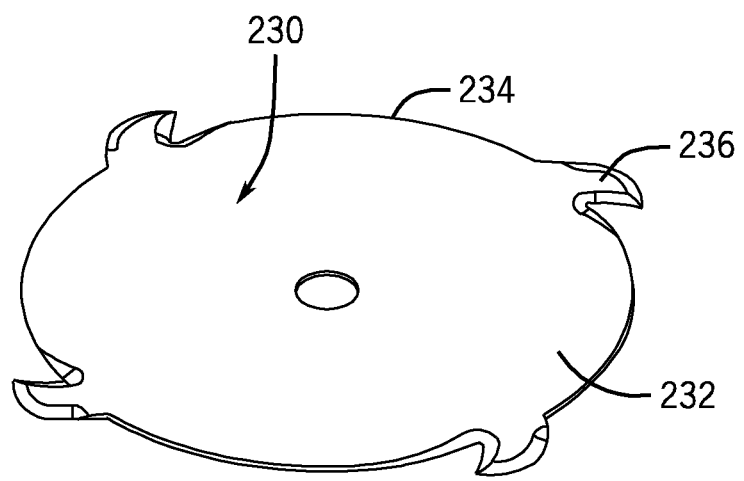
FIG. 11 is a perspective view of a rotating element for a material processing machine with integral extensions according to the present disclosure.

FIG. 11 illustrates an alternative embodiment of a rotating element 230 with a disc 232 having an outer edge 234 to which are positioned integrally formed extensions 236. Extensions 236 may be formed in accordance with the present disclosure with a configuration similar to the attachments, described above.

There are a plurality of illustrative examples of material processing machines or other devices that include rotating elements that may be adapted for use the concepts disclosure in the present application. Each of these devices includes a rotating element that engages material in some fashion. For particular or general usage, it may be advantageous to adapt the rotating elements of one or all of these machines to include the attachment with a forward extending cutting edge or include an integrally formed extension with a forward extending cutting edge.

As indicated above, in conventional apparatus, the outer edge of conventional flighting, and knives attached thereto, are configured to press a larger bale against a side of a mixing or processing tub to assist in breaking up the bale, placing large stresses on the tub walls, the rotating element, the shaft providing rotational force to the rotating element and the motor or drive engaging the shaft. Such a structure can also require a great deal of torque from the motor or drive. The attachment of the present disclosure may reduce the lateral stresses on the various elements of a material processing machine and may permit a smaller motor or drive system to be used for processing the same size and weight of material.

Figure 12:
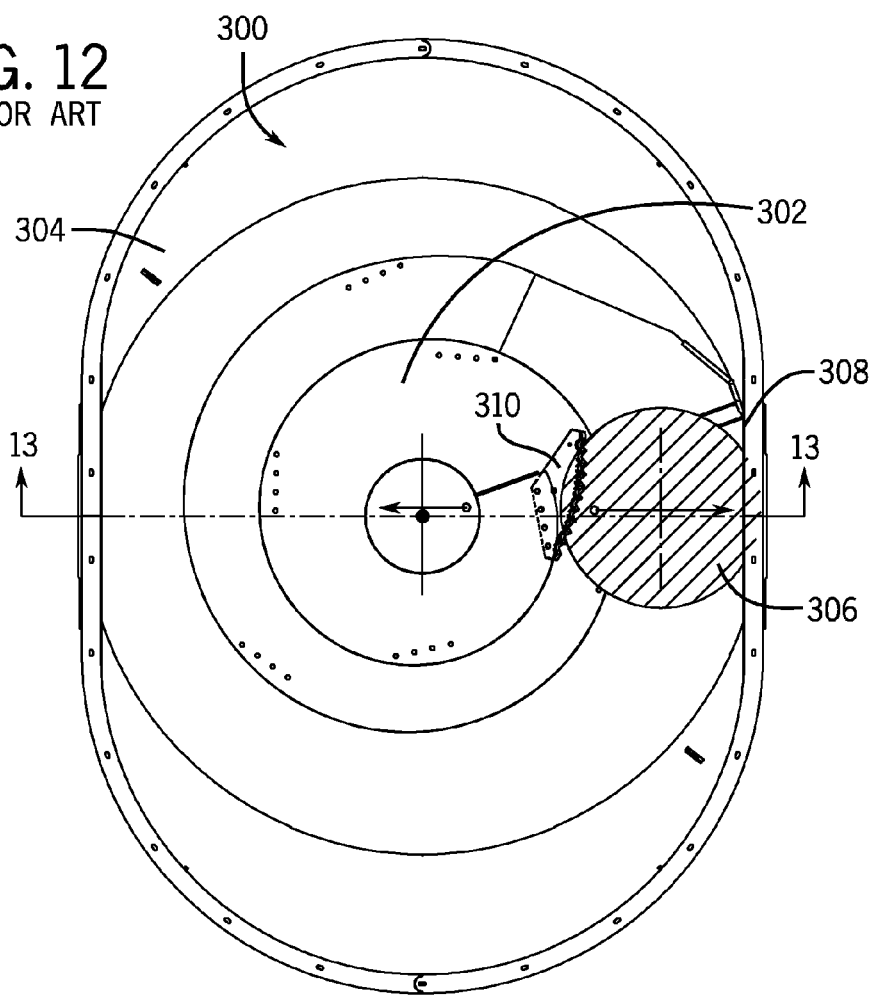
FIG. 12 is a top view of a prior art vertical feed mixer with a conventional attachment mounted to the vertical screw.
Figure 13:
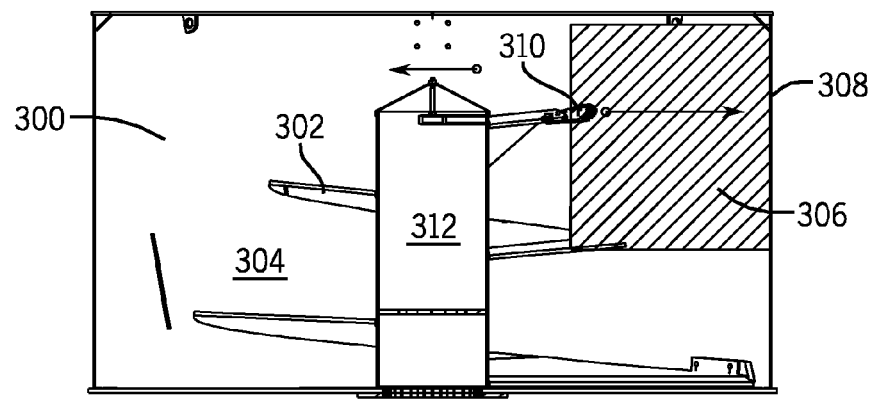
FIG. 13 is a cross-sectional view of the prior art vertical feed mixer of FIG. 12, taken along line 13-13.

FIGS. 12 and 13 illustrate a conventional vertical feed mixer 300 with a vertical screw 302 rotatably mounted within a hopper 304. A bale of feed material 306 is positioned between the vertical screw and a side wall 308 of hopper 304. A conventional attachment 310 mounted to an outer edge of vertical screw 302 and is engaging bale 306. The only way that attachment 310 aids in the reduction of bale 306 to smaller pieces to be processed and mixed within the hopper is for the screw and the attachment to press the bale against side wall 308. As attachment 310 engages bale 306 more fully, the pressure exerted against the side wall increases, as the attachment acts as a wedge to drive the bale more tightly against the side wall. Any forces exerted to press the bale against the side wall must be counter-acted by forces exerted oppositely against the center core 312. These side loads against core 312 will stress the bearings holding vertical screw 302 rotatably within vertical feed mixer 300, and will require more torque to be supplied by a prime mover of the vertical feed mixer to overcome higher amounts of friction due to these side loads.

FIGS. 14 and 15 illustrate a vertical feed mixer 320 according to the present disclosure including a vertical screw 322 rotatably mounted within a hopper 324. A bale of material 326 is positioned between the vertical screw and a side wall 328 of hopper 324. An attachment 330 according to the present disclosure is mounted to an outer edge of screw 322 and is engaging bale 326. As attachment 330 engages bale 326, the action of the rotation of vertical screw and the angle of the leading edge of the attachment immediately begin to tear into bale 326. This tearing and reduction of size of bale 326 is accomplished without having to drive the bale ever more tightly against the side wall 328. The shape and angle of the attachment does not operate as a wedge to drive the bale 326 against the side wall 328, but rather serves to pull the bale into the screw 322 as the attachment 330 drives into the side of the bale. Lower forces against the side wall 328 will result in lower forces acting sideways against a central core 332 of screw 322, less load on bearings holding the screw rotatably within vertical feed mixer 320, and less resistance to movement of screw 322, in turn requiring less torque supplied by a prime mover of the vertical feed mixer.

FIG. 16 illustrates another embodiment of attachments for rotating screws according to the present disclosure. A screw 350 includes a plurality of attachments 352 mounted to mounting points 354 along an outer edge 356 of the vertical screw. Mounting points 354 are configured to provide an outward extension 358 of screw 350 to which attachment 352 may be mounted to a front face 360 of the extension. Whereas some of the embodiments described and illustrated above may be suitable for possible retro-fitting to existing vertical screws and feed mixers, among other types of devices, attachments 352 are configured to be mounted to a purpose-built vertical screw. Extensions 358 may provide additional support to attachments 352 and add strength to the overall structure. Preferably, attachments 352 may be removably mounted to the extensions 358 such as by removable fasteners 362 to permit removal and replacement of attachments 352 as they wear or are damaged during use.

FIG. 17 illustrates a further embodiment for mounting an attachment 372 to a vertical screw of a device. A mount 376 is configured to include an outer recess 378 for receiving attachment 372. Preferably, outer recess 378 is sized to be slightly smaller than attachment 372 to permit an outer beveled edge 380 of attachment 372 to be exposed beyond the limits of recess 378. Preferably, attachment is removably mounted such as by removable fasteners 374. Recess 378 allows additional support to be provided to attachment 372 while still permitting the outer sharpened cutting edges of the attachment to engage material within the device in which the screw is mounted. Mount 376 may further include an inboard end 382 to permit the mount to be attached or secured to the vertical screw. Such attachment may be removable, such as by use of removable fasteners, or it may be more permanent in the form of welding or bonding the mount to the screw. Whatever method of mounting is used, the mount should be positioned so that a forward edge 373 of attachment 372 is angled forward with respect to the direction of rotation and extends beyond an outer edge of the screw.

It is not intended to limit the application of the concepts of the present disclosure in any way through the inclusion of these illustrative examples of possible applications for the forward extending element, whether as a separate piece mounted to a rotating element or as an integrally formed portion of a rotating element.

While the invention has been described with reference to preferred embodiments, it is to be understood that the invention is not intended to be limited to the specific embodiments set forth above. Thus, it is recognized that those skilled in the art will appreciate that certain substitutions, alterations, modifications, and omissions may be made without departing from the spirit or intent of the invention. Accordingly, the foregoing description is meant to be exemplary only, the invention is to be taken as including all reasonable equivalents to the subject matter of the invention, and should not limit the scope of the invention set forth in the following claims.

What is claimed is:

1. A material processing machine including a rotating element, the material processing machine comprising:

a hopper for receiving and processing material, the rotating element mounted within the hopper and configured to engage the material within the hopper;

the rotating element including helical flighting positioned about a central axis of rotation, and rotating in a direction of rotation, the flighting including an outer edge and configured to rotate so that the flighting engages the material within the hopper;

at least one attachment mounted to the outer edge of the flighting, the at least one attachment extending beyond the outer edge of the flighting;

the attachment including a sharpened edge, the sharpened edge having an inner sharpened edge portion adjacent the outer edge of the flighting, the inner sharpened edge portion extending forward, considering the direction of rotation of the rotating element, and outward away from the outer edge of the flighting, so as to hook the material and pull the material apart.

2. The material processing machine of claim 1 wherein the attachment includes a mounting portion adjacent the inner portion of the forward edge, the mounting portion configured to permit the mounting of the attachment to the flighting.

3. The material processing machine of claim 1 wherein the forward edge of the attachment includes a bevel so that the forward edge has a narrower profile to aid in processing material engaged by the rotating element.

4. The material processing machine of claim 1 wherein the attachment further includes a body with an outer extension of the body extending further from the axis of rotation of rotating element than the outer portion of the forward edge.

5. The material processing machine of claim 1 wherein the outer portion of the forward edge of the attachment defines the furthest extension of the attachment from the axis of rotation.

6. The material processing machine of claim 1, further comprising a plurality of attachments mounted to the outer edge of the flighting of the rotating element.

7. The material processing machine of claim 1 wherein the outer edge of the flighting includes an extension to which the attachment may be mounted.

8. The material processing machine of claim 1, further comprising a mount secured to the flighting adjacent the outer edge of the flighting, the mount providing a mounting location for the attachment.

9. The material processing machine of claim 8 wherein the mount includes a recess within which the attachment may be mounted, and the attachment includes one or more outer edges that extend beyond the recess.

10. A material processing machine including a rotating element, the material processing machine comprising:

a hopper for receiving and processing material, the rotating element mounted within the hopper and configured to engage the material within the hopper;

the rotating element including helical flighting positioned about a central axis of rotation and rotating in a direction of rotation, the flighting including an outer edge and configured to rotate so that the flighting engages the material within the hopper;

at least one extension integrally formed along the outer edge of the flighting, the at least one extension extending beyond the outer edge of the flighting;

the at least one extension including a forward sharpened edge, the forward sharpened edge having an inner sharpened edge portion adjacent the outer edge of the flighting, the inner sharpened edge portion extending forward, considering the direction of rotation of the rotating element, and outward away from the outer edge of the flighting, so as to hook the material and pull the material apart.

11. The material processing machine of claim 10, wherein the forward edge of the extension includes a bevel so that the forward edge has a narrower profile to aid in processing material engaged by the rotating element.

12. The material processing machine of claim 10 wherein the extension further comprises a body with an outer extension, the outer extension extending further from the axis of rotation of rotating element than the outer portion of the forward edge.

13. The material processing machine of claim 12 wherein the outer extension includes a bevel so that a cutting edge is defined by the outer extension.

14. The material processing machine of claim 10 wherein the outer portion of the forward edge of the extension defines the furthest extension of the attachment from the axis of rotation.

15. The material processing machine of claim 10, further comprising a plurality of extensions integrally formed along the outer edge of the flighting of the rotating element.

* * * * *